United States Patent
Kobayashi

(10) Patent No.: US 10,082,855 B2
(45) Date of Patent: Sep. 25, 2018

(54) ELECTRONIC DEVICE AND CONTROL METHOD

(71) Applicant: Kabushiki Kaisha Toshiba, Minato-ku, Tokyo (JP)

(72) Inventor: Hiroki Kobayashi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1056 days.

(21) Appl. No.: 14/479,017

(22) Filed: Sep. 5, 2014

(65) Prior Publication Data

US 2015/0286260 A1    Oct. 8, 2015

Related U.S. Application Data

(60) Provisional application No. 61/974,862, filed on Apr. 3, 2014.

(51) Int. Cl.
  *G06F 1/30*  (2006.01)
  *G06F 1/26*  (2006.01)
  *G06F 1/28*  (2006.01)

(52) U.S. Cl.
  CPC .............. *G06F 1/30* (2013.01); *G06F 1/263* (2013.01); *G06F 1/28* (2013.01); *Y10T 307/658* (2015.04)

(58) Field of Classification Search
  CPC ....... Y10T 307/658; G06F 1/28; G06F 1/263; G06F 1/30

USPC .......................................... 307/72
See application file for complete search history.

(56) References Cited

U.S. PATENT DOCUMENTS 5,739,596 A * 4/1998 Takizawa ............... G06F 1/263
                                                           307/64
2011/0302448 A1   12/2011 Okabe et al.

FOREIGN PATENT DOCUMENTS

JP    2010-049590 A    3/2010
JP    2011-254332 A   12/2011

* cited by examiner

*Primary Examiner* — Rexford Barnie
*Assistant Examiner* — Elim Ortiz
(74) *Attorney, Agent, or Firm* — Knobbe, Martens, Olson & Bear, LLP

(57) ABSTRACT

According to one embodiment, an electronic device is configured to power a component in the electronic device by using power from an AC power device or the battery. The electronic device is configured to output a first signal indicative of whether the power circuit is capable of powering the component. The electronic device is configured to output a second signal indicative of whether at least either of the AC power device or the battery is capable of supplying power used by the power circuit. The electronic device is configured to change a polarity of a third signal for notifying whether the component can be powered based on a polarity of the first signal and the second signal.

7 Claims, 9 Drawing Sheets

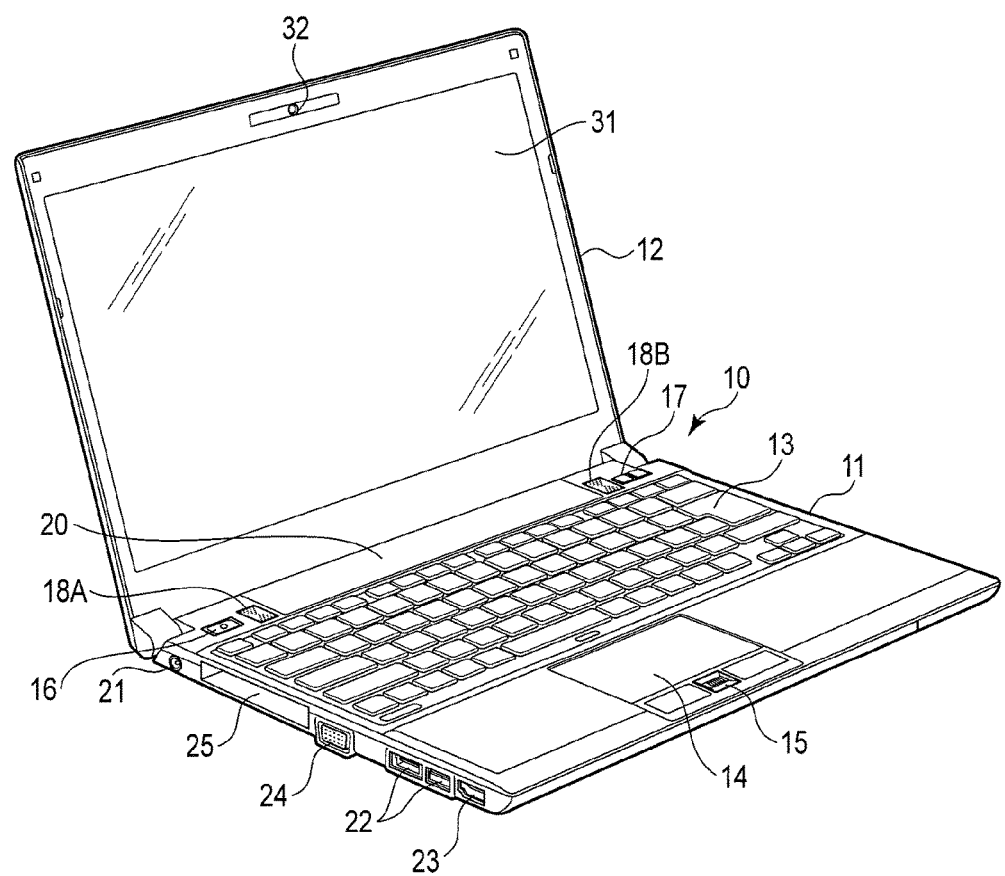
F I G. 1

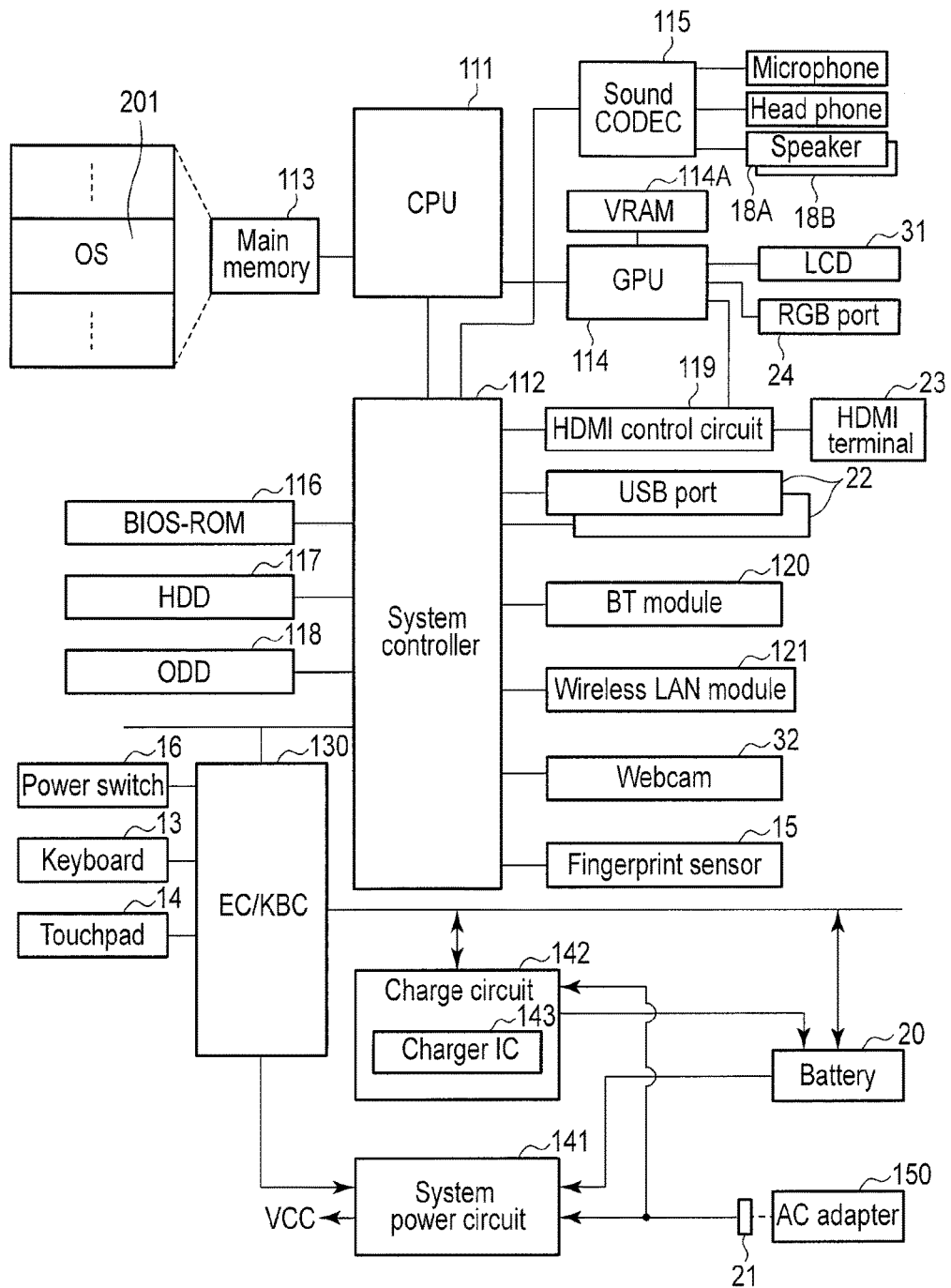
F I G. 2

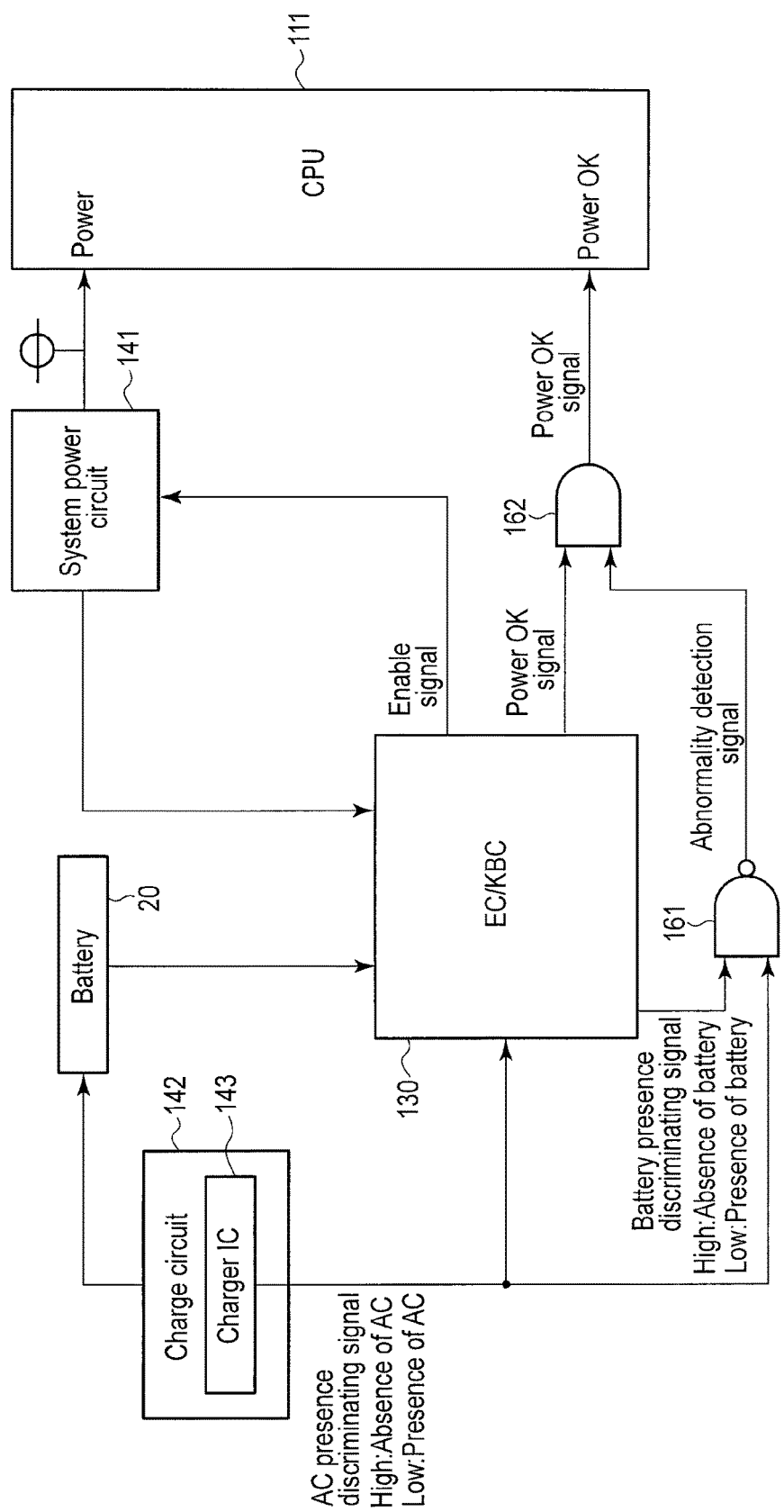
F I G. 4

| Input | | Output |
|---|---|---|
| AC presence discriminating signal | Battery presence discriminating signal | Abnormality detection signal |
| H | H | L |
| L | H | H |
| H | L | H |
| L | L | H |

FIG. 5

| Input | | Output |
|---|---|---|
| Abnormality detection signal | Power OK signal | Output signal |
| L | L | L |
| L | H | H |
| H | L | H |
| H | H | H |

FIG. 6

| Input | | Output |
|---|---|---|
| AC presence discriminating signal | Battery presence discriminating signal | Abnormality detection signal |
| L | L | L |
| H | L | H |
| L | H | H |
| H | H | H |

FIG. 10

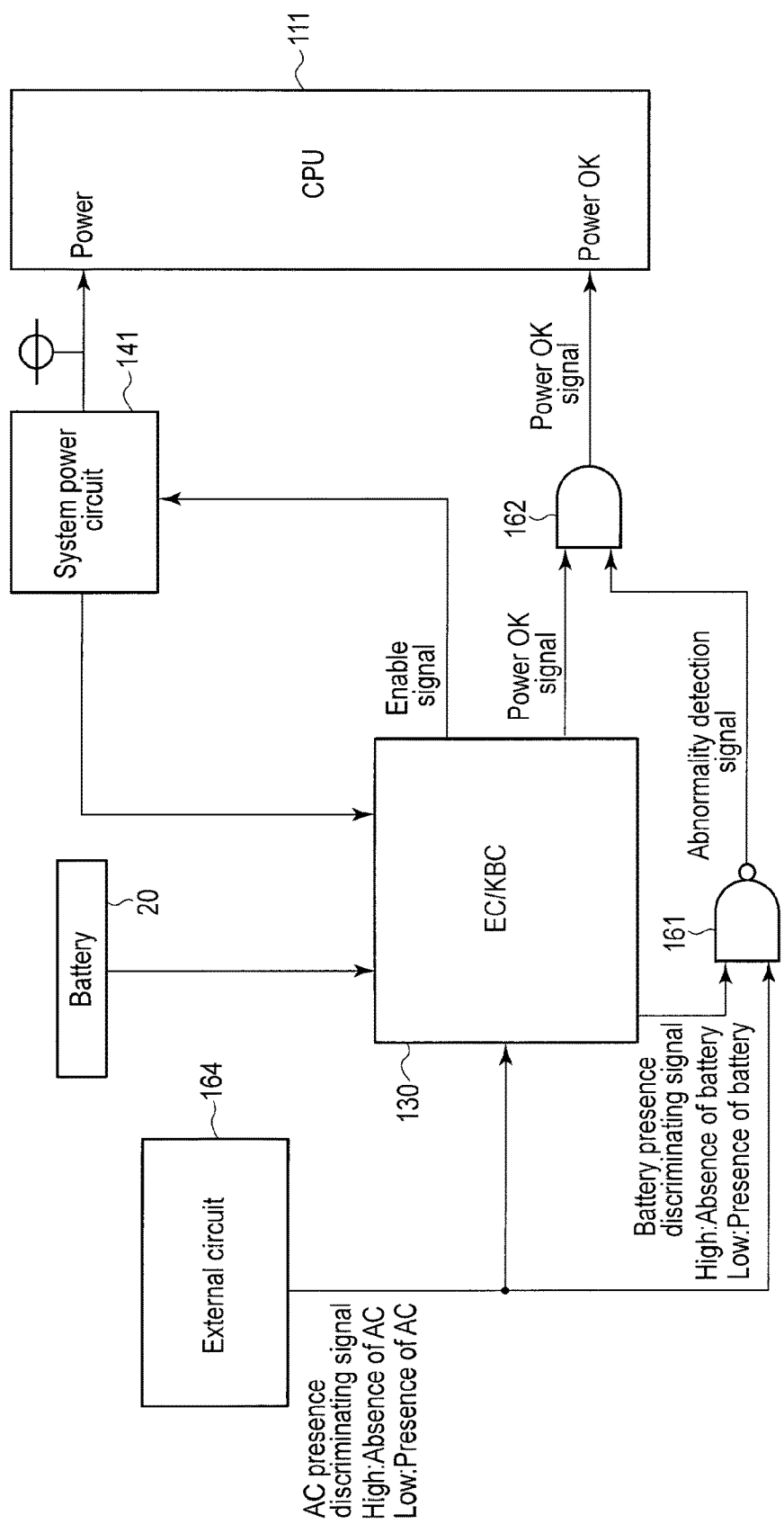
F I G. 11

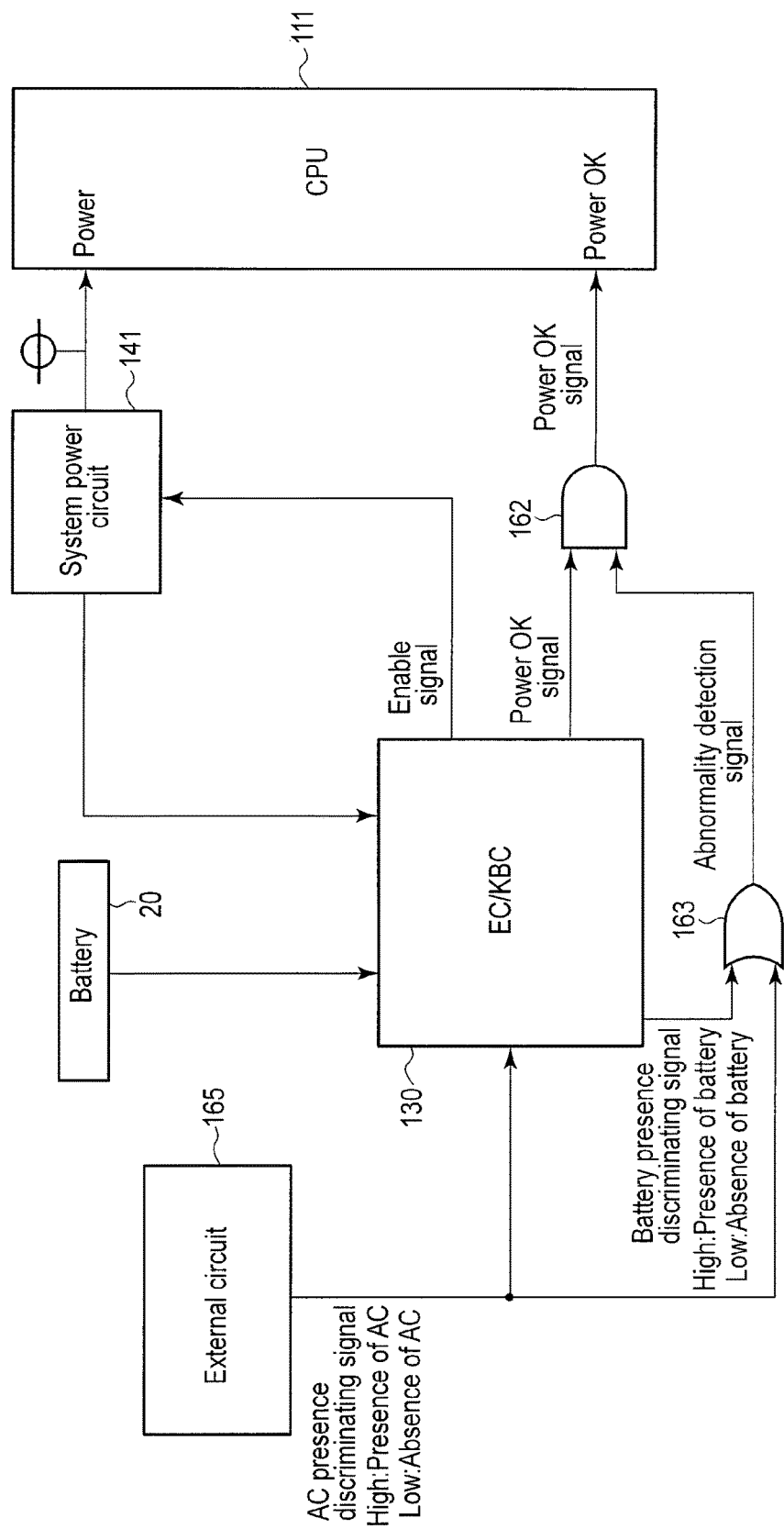
F I G. 12

ELECTRONIC DEVICE AND CONTROL METHOD

CROSS-REFERENCE TO RELATED APPLICATIONS

This application claims the benefit of U.S. Provisional Application No. 61/974,862, filed Apr. 3, 2014, the entire contents of which are incorporated herein by reference.

FIELD

Embodiments described herein relate generally to an electronic device and a control method.

BACKGROUND

In general, a microcontroller such as EC/KBC is used to implement a power sequence specification required by a chipset for a personal computer (PC) and a chip constituted as a system-on-a-chip (SoC). In this case, the power sequence is controlled by firmware (FW) control by a microcontroller. By FW control, it is possible to eliminate a disturbance that causes fluctuation in output and to detect slight abnormalities.

However, if a microcontroller is used to implement the above-mentioned power sequence specification, the following problem accompanied with the characteristic of a microcontroller can occur.

A microcontroller has a characteristic that various processes can be executed only while a power source is supplied to the microcontroller itself. Also, a microcontroller needs to execute predetermined processing within the microcontroller itself in order to perform FW control for power sequence. For this reason, when the power sources of all the systems are lost suddenly, for example, when an AC adapter is removed from a PC with the PC powered on, there is a possibility that a microcontroller cannot complete the predetermined processing within the microcontroller executed for performing FW control for power sequence while a power source is supplied to the microcontroller itself. This can cause a problem that the status of a system indicates an abnormality at the time of rebooting the system.

Therefore, it is required to realize a new technology capable of overcoming the above-mentioned problem.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view illustrating the appearance of an electronic device of an embodiment.

FIG. 2 is a block diagram illustrating a system configuration of the electronic device of the embodiment.

FIG. 4 is a block diagram illustrating a system configuration of the electronic device of the embodiment.

FIG. 5 is a truth table illustrating the result of all the inputs and outputs of a NAND gate of the electronic device of the embodiment.

FIG. 6 is a truth table illustrating the result of all the inputs and outputs of an AND gate of the electronic device of the embodiment.

FIG. 10 is a truth table illustrating the result of all the inputs and outputs of an OR gate of the electronic device shown in FIG. 9.

FIG. 11 is a block diagram illustrating still another circuit configuration of the electronic device for which a power-off sequence can be executed by hardware flow control.

FIG. 12 is a block diagram illustrating further another circuit configuration of the electronic device for which a power-off sequence can be executed by hardware flow control.

DETAILED DESCRIPTION

Figure 3:
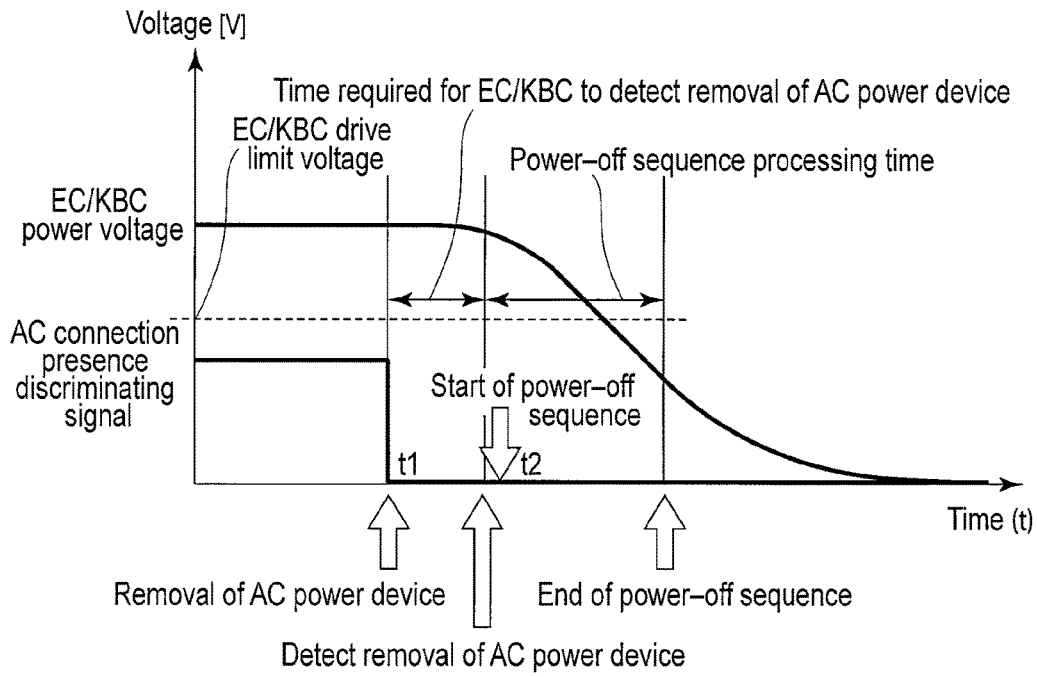
FIG. 3 is a graph illustrating the relationship between time and voltage for a power-off sequence by software flow control.

Various embodiments will be described hereinafter with reference to the accompanying drawings.

In general, according to one embodiment, an electronic device includes a battery, a power circuit, a microcontroller, a first circuit and a second circuit. The power circuit is configured to power a component in the electronic device by using power from an AC power device or the battery. The microcontroller is configured to output a first signal indicative of whether the power circuit is capable of powering the component. The first circuit is configured to output a second signal indicative of whether at least either of the AC power device or the battery is capable of supplying power used by the power circuit. The second circuit is configured to change a polarity of a third signal for notifying whether the component can be powered based on a polarity of the first signal and the second signal.

First of all, the configuration of the electronic device of the embodiment will be explained with reference to FIG. 1. The electronic device can be realized as, for example, a notebook portable personal computer, a tablet terminal or various other portable electronic devices. In the following, it is assumed that the electronic device is realized as a notebook portable personal computer 10.

FIG. 1 is a perspective view where the computer 10 is seen from the front side with its display unit open. The computer 10 is configured to receive power from a battery 20. The computer 10 is configured to supply power (operating power) to a component in the computer 10 by using power from the battery 20 or power from an AC power device (AC adapter).

The computer 10 includes a computer main body 11 and a display unit 12. The display unit 12 incorporates a display device such as a liquid crystal display device (LCD) 31. In addition, a camera (webcam) 32 is arranged on the upper end portion of the display unit 12.

The display unit 12 is attached turnably to the computer main body 11 between an opening position where the upper face of the computer main body 11 is exposed and a closing position where the upper face of the computer main body 11 is covered by the display unit 12. The computer main body 11 includes a thin box-shaped housing, whose upper face is provided with a keyboard 13, a touchpad 14, a fingerprint sensor 15, a power switch 16 for turning the computer 10 on or off, one or more function buttons 17 and speakers 18A and 18B.

Also, the computer main body 11 is provided with a power connector (DC power input terminal) 21. The power connector 21 is arranged on the side, for example, on the left side, of the computer main body 11. The AC power device is removably connected to the power connector 21. An AC adapter can be used as AC power device. The AC adapter is an AC power device configured to convert commercial power (alternating-current [AC] power) into direct-current (DC) power.

The battery 20 is removably mounted on the rear end portion of the computer main body 11. It may be possible for the battery 20 to be incorporated in the computer 10.

The computer 10 is driven by power from the AC power device or power from the battery 20. If the AC power device is connected to the power connector 21 of the computer 10, the computer 10 is driven by power from the AC power device. Note that power from the AC power device is used also for charging the battery 20. If the AC power device is disconnected to the power connector 21 of the computer 10, the computer 10 is driven by power from the battery 20.

Further, the computer main body 11 is provided with some USB ports 22, a High-definition Multimedia Interface (HDMI) output terminal 23 and an RGB port 24.

FIG. 2 illustrates the system configuration of the computer 10. The computer 10 includes a CPU 111, a system controller 112, a main memory 113, a graphics processing unit (GPU) 114, a sound codec 115, a BIOS-ROM 116, a hard disk drive (HDD) 117, an optical disk drive (ODD) 118, a BT (Bluetooth [registered trademark]) module 120, a wireless LAN module 121, an embedded controller/keyboard controller IC (EC/KBC) 130, a system power circuit 141, and a charging circuit 142.

The CPU 111 is a processor configured to control the operation of each component of the personal computer 10. The CPU 111 executes various programs loaded from the HDD 117 to the main memory 113. The programs include an operating system (OS) 201 and various application programs.

Also, the CPU 111 executes a basic input/output system stored in the BIOS-ROM 116, which is a nonvolatile memory. The BIOS is a system program for hardware control.

The GPU 114 is a display controller configured to control the LCD 31, which is used as a display monitor of the personal computer 10. The GPU 114 generates a display signal (LVDS signal) that should be supplied from display data stored in a video memory (VRAM) 114A to the LCD 31. In addition, the GPU 114 is capable of generating an analogue RGB signal and an HDMI video signal. The analogue RGB signal is supplied to an external display via the RGB port 24. The HDMI output terminal 23 is capable of transmitting to an external display an HDMI video signal (uncompressed digital video signal) and a digital audio signal by a single cable. The HDMI control circuit 119 is an interface for transmitting an HDMI video signal and a digital audio signal to the external display via the HDMI output terminal 23.

The system controller 112 is a bridge device configured to connect between the CPU 111 and each component. The system controller 112 incorporates a serial ATA controller configured to control the hard disk drive (HDD) 117 and the optical disk drive (ODD) 118. Also, devices such as the USB port 22, the BT module 120, the wireless LAN module 121, the Web camera 32 and the fingerprint sensor 15 are connected to the system controller 112.

The EC/KBC 130 is a power management controller configured to execute power management of the computer 10. The EC/KBC 130 is realized as, for example, a one-chip microcomputer that incorporates a keyboard controller configured to control the keyboard (KB) 13 and the touchpad 14. The EC/KBC 130 has a function to power the computer 10 on or off in response to the user's operation of the power switch 16. Also, the EC/KBC 130 powers off the computer 10 even when a power-off instruction operation is given by the user to the operating system (OS). The EC/KBC 130, including a memory configured to store a power-off sequence program and a processor configured to read and execute the program, executes a power-off sequence in accordance with the user's operation of the power switch 16 or the OS. The control of power-on/off of the computer 10 (power sequence control) is executed by cooperating with the EC/KBC 130 and the system power circuit 141.

The system power circuit 141 is a linear power circuit constituted by using a series regulator (voltage regulator). The system power circuit 141 is a power circuit configured to supply power (operating power Vcc) to each component of the computer 10 by using power (DC power) from the battery 20 or power (DC power) from the AC power device. The power input terminal of the system power circuit 141 is connected to the power connector 21. Therefore, if the AC power device is connected to the power connector 21 via a power cable, the system power circuit 141 is capable of receiving power from the AC power device.

On receiving an ON signal transmitted from the EC/KBC 130 (i.e., when an Enable signal is turned on), the system power circuit 141 supplies operating power to each component in the computer 10. On receiving an OFF signal transmitted from the EC/KBC 130 (i.e., when an Enable signal is turned off), the system power circuit 141 stops supplying operating power to each component in the computer 10.

The EC/KBC 130 is capable of communicating with each of the charging circuit 142 and the battery 20 via a serial bus. The charging circuit 142 is a circuit configured to charge the battery 20 by using DC power from the AC power device. The charging circuit 142 includes a charger IC 143 configured to control a charge current and a charge voltage output to the battery 20. The charge current is an adjusted output current of the charging circuit 142 and is used for charging the battery 20. The charge voltage is an adjusted output voltage of the charging circuit 142 and can be called battery voltage.

The EC/KBC 130, the system power circuit 141, the charging circuit 142 and the charger IC 143 operate as long as power is supplied from the AC power device or the battery 20, even while the computer 10 is powered off.

Conventionally, power-off sequence (control of power-off) by the software (firmware) flow control (referred to as "SW control" hereinafter) shown in FIG. 3 is performed for a computer, when the power sources of all the systems are lost suddenly, for example, when an AC power device is removed.

FIG. 3 is a graph illustrating the relationship between time and voltage for power-off sequence by SW control. In the case of SW control, as shown in FIG. 3, when the AC power device is removed at time t1, the removal of the AC power device at time t2 is detected based on an AC presence discriminating signal supplied from the charger IC 143 in the charging circuit 142. On detecting the removal of the AC power device, the EC/KBC 130 starts to execute power-off sequence.

Specifically, the EC/KBC 130 executes the processing of turning a Power OK signal from High to Low by SW control (FW control). It is thereby possible to notify to the CPU 111 in advance that power cannot be supplied. Subsequently, the EC/KBC 130 outputs an OFF signal to the system power circuit 141. In other words, the EC/KBC 130 executes the processing of turning an Enable signal to the system power circuit 141 from on to off. It is thereby possible to stop supplying power from the system power circuit 141 to the CPU 111. Then, after the EC/KBC 130 receives from the system power circuit 141 a notification that power supply to the CPU 111 has been stopped, the power-off sequence is successfully completed.

However, in the above-mentioned power-off sequence by SW control, a lag occurs between a time when the AC power device is removed and a time when the EC/KBC 130 starts to execute the power-off sequence (i.e., a time when the EC/KBC 130 detects the removal of the AC power device). In addition, in the above-mentioned power-off sequence by SW control (FW control), a time in milliseconds is required by the time that the EC/KBC 130 turns the Power OK signal to the CPU 111 from High to Low. It is therefore likely that power-off sequence is not successfully completed since power supply to the EC/KBC 130 is stopped before the power-off sequence is successfully completed. The unsuccessful completion of power-off sequence can cause a problem, for example, that a register configured to accumulate information about the CPU 111 does not function properly.

In the present embodiment, the power-off sequence by SW control (FW control) by the EC/KBC 130 and the power-off sequence by hardware flow control (referred to as "HW control" hereinafter) are used together. The power-off sequence by SW control is executed during normal power-off (for example, power-off in accordance with the user's power-off instruction operation) while the power-off sequence by HW control is executed when abnormality occurs such as unexpected removal of the AC power device. FIG. 4 is a block diagram illustrating a circuit configuration of a computer for which the power-off sequence by HW control can be executed. For the execution of the power-off sequence by HW control, the computer 10 includes the CPU 111, the EC/KBC 130, the system power circuit 141, the charging circuit 142, a NAND gate 161 and an AND gate 162, as shown in FIG. 4. Note that the explanation of the CPU 111, the EC/KBC 130, the system power circuit 141 and the charging circuit 142 will be omitted in the following as already described in detail.

First of all, the NAND gate 161 will be explained.

The NAND gate 161 is a logic circuit configured to perform a logical operation (NAND) based on the AC presence discriminating signal and the battery presence discriminating signal.

The AC presence discriminating signal is a signal supplied from the charger IC 143 in the charging circuit 142 to the NAND gate 161 (and the EC/KBC 130), indicating whether the AC power device is capable of powering the computer 10 (i.e., whether the AC power device is connected to the computer 10). In the circuit configuration of FIG. 4, (the polarity of) the AC presence discriminating signal is High when the AC power device is incapable of powering the computer 10, and Low when the AC power device is capable of powering the computer 10.

The battery presence discriminating signal is a signal supplied from the battery 20 to the NAND gate 161 via the EC/KBC 130, indicating whether the battery 20 incorporated in the computer 10 is capable of powering the computer 10 (i.e., whether the battery 20 is sufficiently charged). In the circuit configuration of FIG. 4, the battery presence discriminating signal is High when the battery 20 is incapable of powering the computer 10, and Low when the battery 20 is capable of powering the computer 10. Note that while FIG. 4 shows that a circuit configuration where the battery presence discriminating signal is supplied to the NAND gate 161 via the EC/KBC 130, it may also be possible for the battery presence discriminating signal to be output directly to the NAND gate 161 from the battery 20 without the EC/KBC 130.

The NAND gate 161 outputs an abnormality detection signal to the AND gate 162, as a result of the above-mentioned logical operation based on the AC presence discriminating signal and the battery presence discriminating signal.

Here, the result of all the inputs and outputs of the NAND gate 161 will be explained with reference to FIG. 5. FIG. 5 is a truth table illustrating the result of all the inputs and outputs of the NAND gate 161. As shown in FIG. 5, the NAND gate 161 sets to Low the abnormality detection signal output to the AND gate 162, only when both the AC presence discriminating signal and the battery presence discriminating signal are High. On the other hand, the NAND gate 161 sets to High the abnormality detection signal output to the AND gate 162, only when either or both of the AC presence discriminating signal or/and the battery presence discriminating signal is Low.

Next, the AND gate 162 will be explained.

The AND gate 162 is a logic circuit configured to perform a logical operation (OR) based on the abnormality detection signal and the Power OK signal.

The abnormality detection signal is a signal supplied from the NAND gate 161 to the AND gate 162 to indicate whether an abnormality that can affect the power-off sequence has been detected. An abnormality that can affect the power-off sequence refers to the state where both the AC power device and the battery 20 are incapable of powering the computer 10. As already mentioned, in the circuit configuration shown in FIG. 4, the abnormality detection signal is High when either one or both of the AC power device and the battery 20 are capable of powering the computer 10, and is Low when both the AC power device and the battery 20 are incapable of powering the computer 10.

The Power OK signal is a signal supplied from the EC/KBC 130 to the AND gate 162, indicating whether power enough to continue to successfully operate the computer 10 can be supplied (i.e., the system power circuit 141 is capable of powering the computer 10). In the circuit configuration of FIG. 4, the Power OK signal is High when various power sources are capable of supplying enough power to continue to successfully operate the computer 10, and is Low when various power sources are incapable of supplying enough power to continue to successfully operate the computer 10. Also, when the EC/KBC 130 executes a power-off sequence of SW control to successfully power off, the EC/KBC 130 switches the Power OK signal from High to Low in a predetermined stage of the power-off sequence.

The AND gate 162 outputs the Power OK signal to the CPU 111, as a result of the above-mentioned logical operation based on the abnormality detection signal and the Power OK signal. In other words, the AND gate 162 executes the processing of keeping the Power OK signal High or turning the Power OK signal from High to Low.

Here, the result of all the inputs and outputs of the AND gate 162 will be explained with reference to FIG. 6. FIG. 6 is a truth table illustrating the result of all the inputs and outputs of the AND gate 162. As shown in FIG. 6, the AND gate 162 keeps the Power OK signal output to the CPU 111 High when either one or both of the abnormality detection signal and the Power OK signal are High, and turns the Power OK signal output to the CPU 111 to Low, only when both the abnormality detection signal and the Power OK signal are Low.

Figure 7:
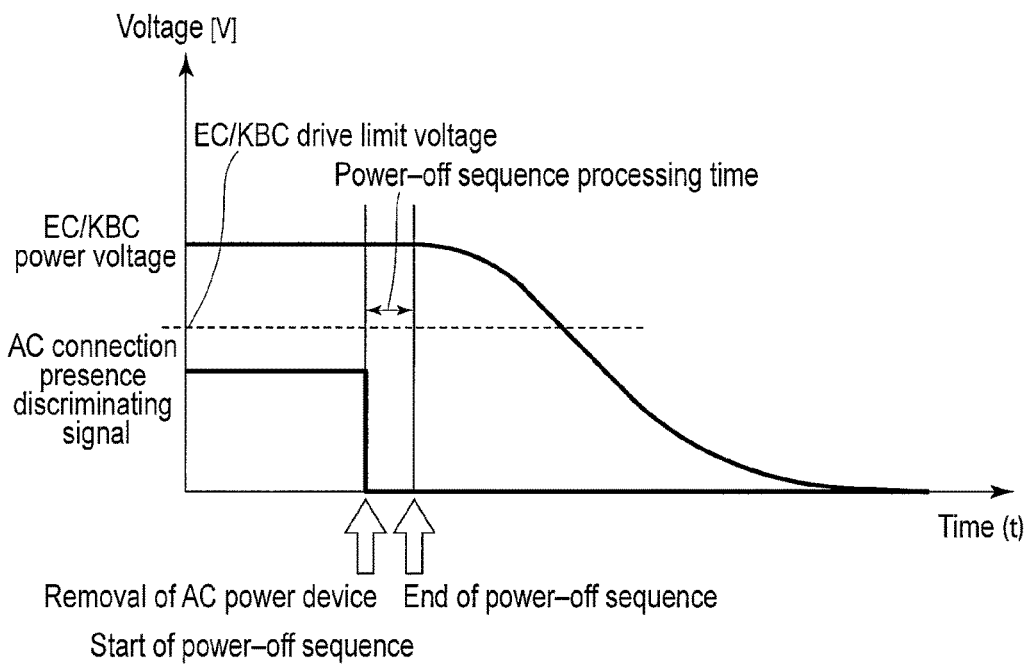
FIG. 7 is a graph illustrating the relationship between time and voltage for a power-off sequence of the electronic device of the embodiment.

As mentioned above, in the present embodiment, when the output of the AND gate 162 is Low, the processing of turning the Power OK signal from High to Low is executed by the AND gate 162 instead of the EC/KBC 130. It is thereby possible to shorten from milliseconds to nanoseconds the time to make the Power OK signal Low and also possible to successfully complete the power-off sequence with allowance, as shown in, for example, FIG. 7.

Figure 8:
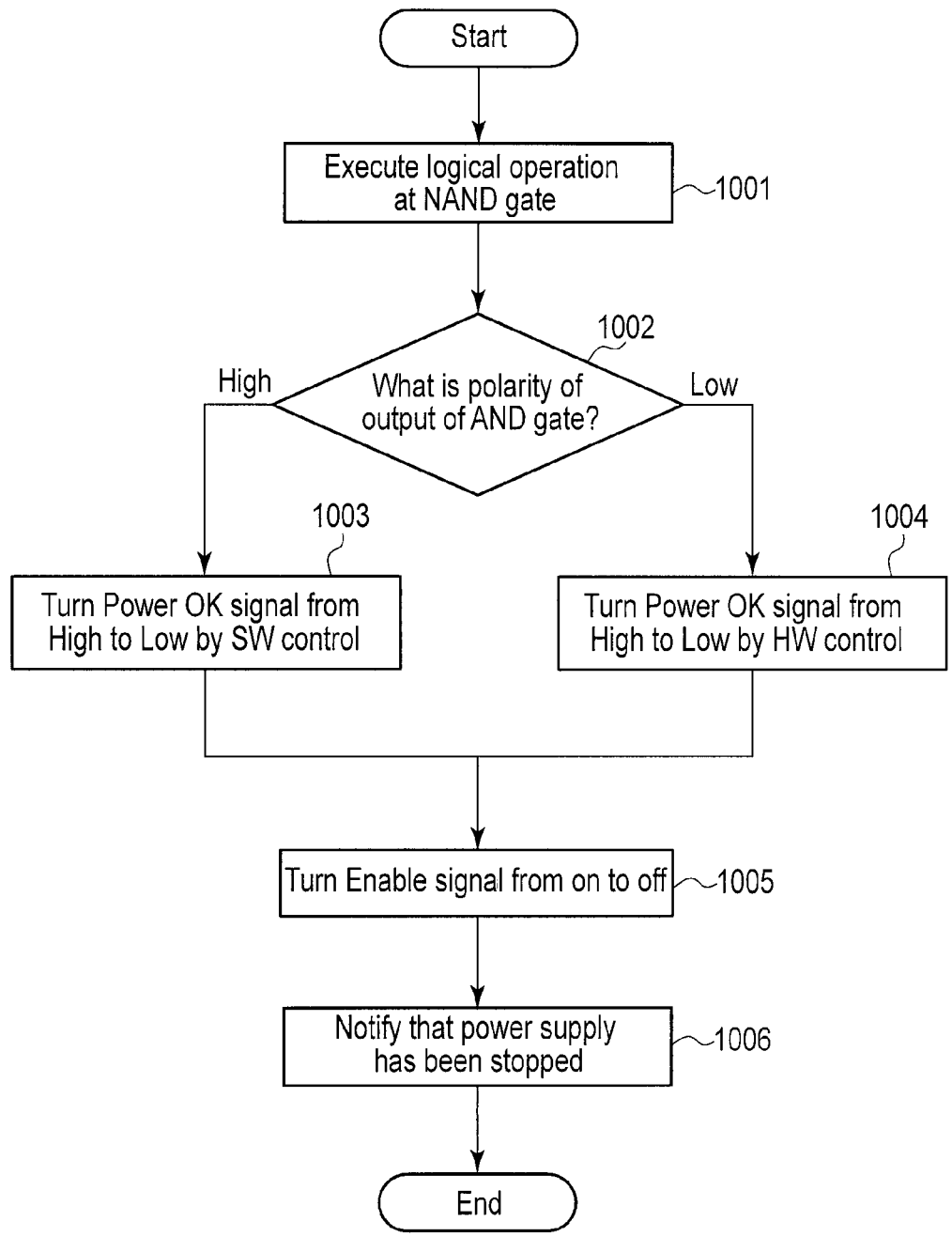
FIG. 8 is a flowchart illustrating the operation of each unit at the time of executing a power-off sequence by the electronic device of the embodiment.

Next, the power-off sequence by the computer 10 including the circuit configuration shown in FIG. 4 will be explained with reference to the flowchart of FIG. 8.

To begin with, the NAND gate 161 performs a logical operation based on the AC presence discriminating signal supplied from the charger IC 143 and the battery presence discriminating signal supplied from the battery 20 via the EC/KBC 130. Then, the NAND gate 161 outputs the abnormality detection signal to the AND gate 162 as a result of the logical operation (block 1001). In this case, the NAND gate 161 sets the abnormality detection signal to Low when both the AC presence discriminating signal and the battery presence discriminating signal are High, and sets the abnormality detection signal to High when either one or both of the AC presence discriminating signal and the battery presence discriminating signal are Low.

Subsequently, the AND gate 162 performs a logical operation based on the abnormality detection signal output from the NAND gate 161 and the Power OK signal supplied from the EC/KBC 130. The AND gate 162 performs the processing of block 1003 or block 1004 mentioned later, in accordance with the logical operation (block 1002). Note that the AND gate 162 sets the output to High when either one or both of the abnormality detection signal and the Power OK signal is High, and sets the output to Low only when both the abnormality detection signal and the Power OK signal are Low.

When the output from the AND gate 162 is High (block 1002, High), the EC/KBC 130 executes the processing of turning the Power OK signal from High to Low by SW control (FW control) (block 1003).

When the output from the AND gate 162 is Low (block 1002, Low), the AND gate 162 executes the processing of turning the Power OK signal from High to Low by HW control (block 1004).

Then, the EC/KBC 130 outputs an OFF signal to the system power circuit 141. In other words, the EC/KBC 130 executes the processing of turning an Enable signal to the system power circuit 141 from on to off (block 1005). It is thereby possible to stop supplying power from the system power circuit 141 to the CPU 111.

Thereafter, after the EC/KBC 130 receives from the system power circuit 141 a notification that power supply to the CPU 111 has been stopped (block 1006), the power-off sequence is successfully completed.

Note that in the circuit configuration shown in FIG. 4, while it has been explained that a Low AC presence discriminating signal is output when the AC power device is capable of powering the computer 10 and the charger IC 143 is configured to output a High AC presence discriminating signal is used when the AC power device is incapable of powering the computer 10, it may also be possible that other chargers ICs are used. Specifically, it may be possible that a High AC presence discriminating signal is output when the AC power device is capable of powering the computer 10 while a charger IC configured to output a Low AC presence discriminating signal is used when the AC power device is incapable of powering the computer 10.

Figure 9:
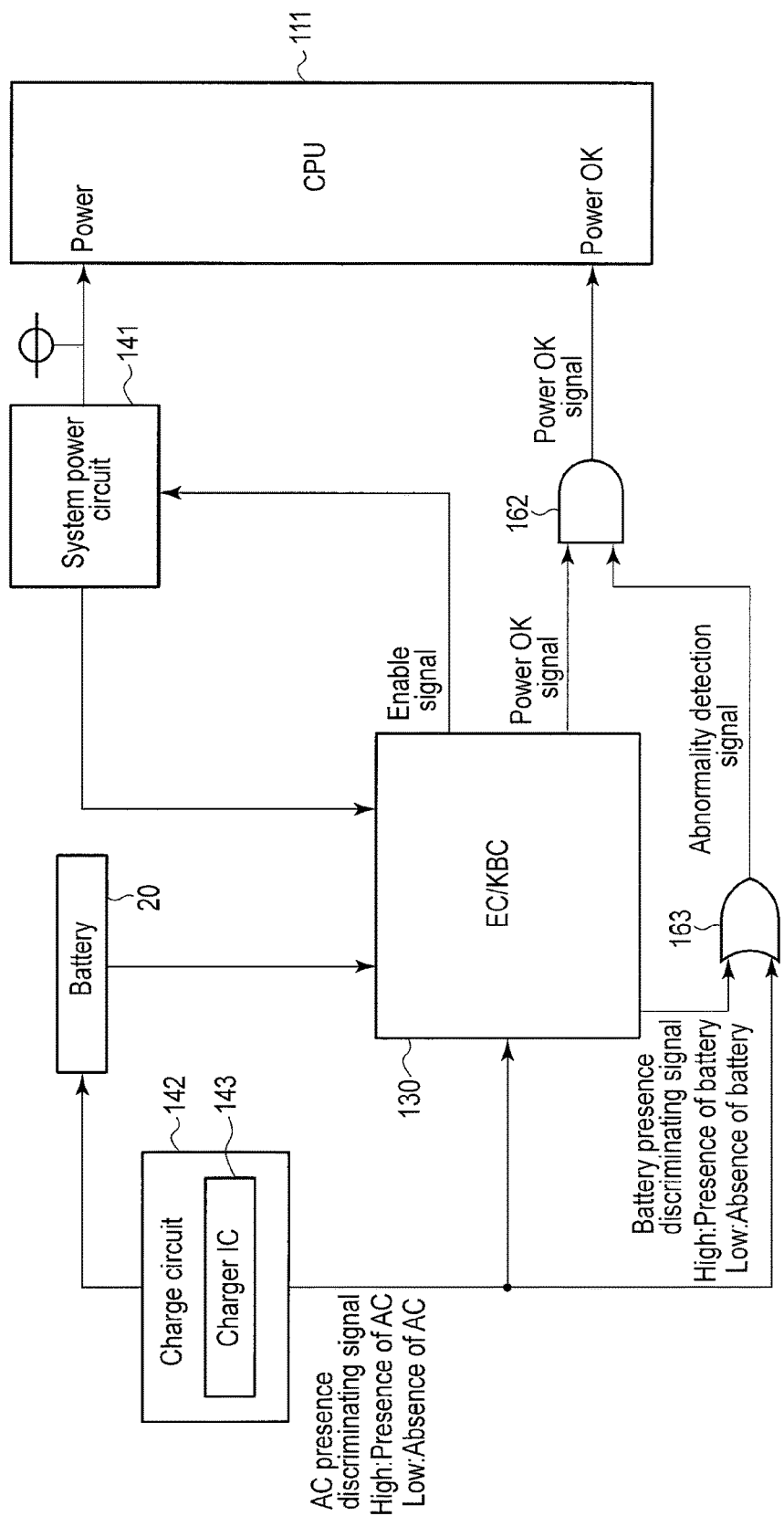
FIG. 9 is a block diagram illustrating another circuit configuration of an electronic device for which a power-off sequence can be executed by hardware flow control.

In this case, the circuit configuration is similar to that shown in FIG. 9. FIG. 9 is a block diagram illustrating another circuit configuration of a computer for which a power-off sequence by HW control can be executed. The circuit configuration shown in FIG. 9 differs from that shown in FIG. 4 in that an OR gate 163 is used instead of the NAND gate 161. Also, the polarity changes in the battery presence discriminating signal output by the EC/KBC 130. Specifically, the battery presence discriminating signal is High when the battery 20 is capable of powering the computer 10, and is Low when the battery 20 is incapable of powering the computer 10

The OR gate 163 is a logic circuit configured to perform a logical operation (OR) based on the AC presence discriminating signal and the battery presence discriminating signal and outputs the abnormality detection signal to the AND gate 162 as a result of the logical operation.

Here, the result of all the inputs and outputs of the OR gate 163 will be explained with reference to FIG. 10. FIG. 10 is a truth table illustrating the result of all the inputs and outputs of the OR gate 163. As shown in FIG. 10, the OR gate 163 sets to Low the abnormality detection signal output to the AND gate 162 when both the AC presence discriminating signal and the battery presence discriminating signal are Low, and sets to High the abnormality detection signal output to the AND gate 162 when either one or both of the AC presence discriminating signal and the battery presence discriminating signal are High.

The power-off sequence can be executed in the circuit configuration shown in FIG. 9, in the same way as the one already mentioned in FIG. 4.

Also, while it has been explained that a charger IC is used in the circuit configuration shown in FIGS. 4 and 9, it may be possible to use an external circuit capable of discriminating whether the AC power device is capable of powering the computer 10. When using an external circuit 164 capable of outputting the AC presence discriminating signal, which gets Active Low when the AC power device is capable of powering the computer 10, the circuit configuration is similar to that shown in FIG. 11. When using an external circuit 165 capable of outputting the AC presence discriminating signal, which gets Active High when the AC power device is capable of powering the computer 10, the circuit configuration is similar to that shown in FIG. 12. Note that in the circuit configuration shown in FIG. 11, the EC/KBC 130, the NAND gate 161, the AND gate 162 and the external circuit 164 may be included in a single package. Similarly, in the circuit configuration shown in FIG. 12, the EC/KBC 130, the AND gate 162, the OR gate 163 and external circuit 165 may be included in a single package.

According to the above-mentioned embodiment, only when both the AC power device and the battery 20 are incapable of powering the computer 10, the structure including a circuit for which the power-off sequence can be executed without the EC/KBC 130 (the NAND gate 161, the AND gate 162 and the OR gate 163) allows the power-off sequence to be successfully completed even when the power sources of the all the systems are suddenly lost.

Also, since each processing in the present embodiment can be realized by a computer program, the same effect as the present embodiment can be easily realized only by installing and executing the computer program to a normal computer through a computer-readable storage medium that stores the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device, comprising:
   a battery;
   a power circuit configured to power a component in the electronic device by using power from an AC power device or the battery;
   a microcontroller configured to output a first signal indicative of whether the power circuit is capable of powering the component;
   a first circuit configured to output a second signal indicative of whether at least either of the AC power device or the battery is capable of supplying power used by the power circuit; and
   a second circuit configured to output a power-off signal to a processor configured to control the component when both of the first signal and the second signal are not enable signals, wherein
   the microcontroller executes power-off sequence under software control when either one or both of the first signal and the second signal are the enable signals.

2. The electronic device of claim 1, wherein
   the second circuit is configured to output a power-on signal to the processor when either one or both of the first signal and the second signal are the enable signals.

3. The electronic device of claim 1, further comprising a receiver configured to receive a power-off instruction signal according to a user operation, wherein
   the microcontroller executes the power-off sequence in accordance with the power-off instruction signal.

4. The electronic device of claim 1, further comprising a circuit configured to output a Low-polarity signal when the power can be supplied from the AC power device and to output a High-polarity signal when the power cannot be supplied from the AC power device, wherein
   the first circuit is a NAND circuit and the second circuit is an AND circuit when the Low-polarity signal is output when the power can be supplied from the battery and the High-polarity signal is output when the power cannot be supplied from the battery.

5. The electronic device of claim 1, further comprising a circuit configured to output a High-polarity signal when the power can be supplied from the AC power device and to output a Low-polarity signal when the power cannot be supplied from the AC power device, wherein
   the first circuit is an OR circuit and the second circuit is an AND circuit when the High-polarity signal is output when the power can be supplied from the battery and the Low-polarity signal is output when the power cannot be supplied from the battery.

6. A control method applicable to an electronic device, comprising:
   a battery; a power circuit configured to power a component in the electronic device by using power from an AC power device or the battery; and a microcontroller configured to output a first signal indicative of whether the power circuit is capable of powering the component; comprising:
   outputting a second signal indicative of whether at least either of the AC power device or the battery is capable of supplying power used by the power circuit;
   outputting a power-off signal from a second circuit to a processor configured to control the component when both of the first signal and the second signal are not enable signals; and
   executing power-off sequence by the microcontroller under software control when either one or both of the first signal and the second signal are the enable signals.

7. The control method of claim 6,
   further comprising:
   outputting a power-on signal from the second circuit to the processor when either one or both of the first signal and the second signal are the enable signals.

* * * * *